(12) United States Patent
Li et al.

(10) Patent No.: US 10,539,834 B2
(45) Date of Patent: Jan. 21, 2020

(54) DISPLAY SUBSTRATE, METHOD FOR MANUFACTURING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongpeng Li, Beijing (CN); Jian Li, Beijing (CN); Yuguang Fan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 15/099,360

(22) Filed: Apr. 14, 2016

(65) Prior Publication Data
US 2016/0349575 A1    Dec. 1, 2016

(30) Foreign Application Priority Data
May 26, 2015  (CN) .......................... 2015 1 0275808

(51) Int. Cl.
G02F 1/1337     (2006.01)
G02F 1/1339     (2006.01)
G02F 1/1335     (2006.01)

(52) U.S. Cl.
CPC .... *G02F 1/133784* (2013.01); *G02F 1/13394* (2013.01); *G02F 1/133514* (2013.01)

(58) Field of Classification Search
None
See application file for complete search history.

(56) References Cited

U.S. PATENT DOCUMENTS 5,499,128 A * 3/1996 Hasegawa ........... G02F 1/13394
                                                          349/155
5,710,610 A * 1/1998 Kim .................. G02F 1/133784
                                                          349/126
(Continued)

FOREIGN PATENT DOCUMENTS

CN           1224178 A        7/1999
CN         101446712 A        6/2009
(Continued)

OTHER PUBLICATIONS

First Office Action regarding Chinese Application No. 201510275808.5, dated Jun. 2, 2017. Translation provided by Dragon Intellectual Property Law Firm.

*Primary Examiner* — Ryan Crockett
(74) *Attorney, Agent, or Firm* — Harness, Dickey & Pierce, P.L.C.

(57) ABSTRACT

A display substrate, a method for manufacturing the same and a display device are provided. The display substrate includes: a base substrate; and an alignment layer and multiple supporting spacers, which are on the base substrate. The alignment layer is formed by performing rubbing alignment on an alignment film formed on the base substrate by using a rubbing cloth. A distance between adjacent ones of the multiple supporting spacers in a rubbing alignment direction of the alignment film, and a length of a contact between a fiber of the rubbing cloth and the alignment film during the rubbing alignment meet a first preset condition, so that a number of supporting spacers that are passed through by the fiber of the rubbing cloth during each contact between the fiber and the alignment film is less than or equal to a first threshold value.

17 Claims, 7 Drawing Sheets

(56) References Cited

U.S. PATENT DOCUMENTS

| | | | |
|---|---|---|---|
| 6,219,123 B1 | 4/2001 | Naito et al. | |
| 6,266,121 B1* | 7/2001 | Shigeta | G02F 1/13394 349/156 |
| 7,639,339 B2* | 12/2009 | Kitagawa | G02F 1/13394 349/155 |
| 9,287,296 B2* | 3/2016 | Funahashi | H01L 27/124 |
| 2004/0012751 A1* | 1/2004 | Iizuka | G02F 1/133555 349/156 |
| 2004/0109116 A1* | 6/2004 | Kuan | G02F 1/133784 349/126 |
| 2005/0052607 A1* | 3/2005 | Mori | G02F 1/13394 349/155 |
| 2005/0200799 A1* | 9/2005 | Murai | G02F 1/1339 349/156 |
| 2006/0066801 A1* | 3/2006 | Liu | G02F 1/13394 349/155 |
| 2006/0290860 A1* | 12/2006 | Lee | G02F 1/13394 349/139 |
| 2009/0029072 A1* | 1/2009 | Fujimoto | G02F 1/133723 428/1.26 |
| 2009/0128763 A1 | 5/2009 | Son | |
| 2010/0118254 A1* | 5/2010 | Hashimoto | G02F 1/13394 349/155 |
| 2010/0220276 A1* | 9/2010 | Sato | G02F 1/133345 349/126 |
| 2012/0100333 A1* | 4/2012 | Lu | G02F 1/133784 428/89 |
| 2013/0155367 A1* | 6/2013 | Tomioka | G02F 1/1339 349/155 |
| 2014/0043549 A1* | 2/2014 | Taniguchi | G02F 1/13394 349/15 |
| 2014/0111757 A1* | 4/2014 | Komatsu | G02F 1/136286 349/155 |
| 2014/0204322 A1* | 7/2014 | Miyake | G02F 1/1337 349/123 |
| 2016/0334672 A1* | 11/2016 | Qin | G02F 1/133784 |

FOREIGN PATENT DOCUMENTS

| | | |
|---|---|---|
| CN | 103278967 A | 9/2013 |
| CN | 104460123 A | 3/2015 |
| KR | 20080046843 A | 5/2008 |

* cited by examiner

DISPLAY SUBSTRATE, METHOD FOR MANUFACTURING THE SAME AND DISPLAY DEVICE

CROSS-REFERENCE TO RELATED APPLICATION

This application claims priority to Chinese Patent Application No. 201510275808.5, filed with the Chinese State Intellectual Property Office on May 26, 2015, which is incorporated by reference in its entirety herein.

TECHNICAL FIELD

The disclosure generally relates to the field of display technology, and in particular to a display substrate, a method for manufacturing the same and a display device.

BACKGROUND

In the display industry, the high PPI product is a predominant development direction currently. PPI refers to a number of pixels at a unit area. The higher the PPI is, the lower the granular sensation of the product is, the closer the flat panel display gets to the ultimate object, i.e., printing-like image quantity. However, with improvement in PPI of the product, requirements on the fabricating process is becoming higher and higher. Among others, the most significant is the requirement on the process of rubbing alignment. The process of rubbing alignment in related art generally includes the following steps. Firstly, an alignment film is formed, a supporting spacer (PS) is formed on the alignment film, and then rubbing alignment is performed on the alignment film by using a rubbing alignment apparatus. Due to a certain height of the supporting spacer, it is difficult to perform rubbing alignment at a shadow of the supporting spacer to form a rubbing groove, causing light leakage at the shadow and thus resulting in degraded image quality of the display device.

SUMMARY

In view of this, it is provided a display substrate, a method for manufacturing the same and a display device, for solving the problem of light leakage of the display device caused by the effect of the supporting space on the rubbing alignment.

To solve the above problem, it is provided a display substrate in the disclosure, which includes: a base substrate; and an alignment layer and multiple supporting spacers, which are on the base substrate, with the alignment layer being formed by performing rubbing alignment on an alignment film formed on the base substrate by using a rubbing cloth. A distance between adjacent ones of the multiple supporting spacers in a rubbing alignment direction of the alignment film, and a length of a contact between a fiber of the rubbing cloth and the alignment film during the rubbing alignment meet a first preset condition, so that a number of supporting spacers among the multiple supporting spacers that are passed through by the fiber of the rubbing cloth during each contact between the fiber and the alignment film is less than or equal to a first threshold value.

Optionally, the distance between adjacent ones of the multiple supporting spacers may be 66 micrometers, and the first threshold value may be 2.

Optionally, the display substrate may be a color film substrate further including multiple optical filter units arranged in rows and columns, and the rubbing alignment direction may be a column direction of the optical filter units.

Optionally, some of the multiple optical filter units may be provided with the supporting spacers, and some of the multiple optical filter units may not be provided with the supporting spacers, and the optical filter units provided with the supporting spacers and the optical filter units provided with no supporting spacer may be arranged alternately in the row direction and the column direction.

Optionally, some rows of optical filter units of the multiple optical filter units may be provided with the supporting spacers, and some rows of optical filter units of the multiple optical filter units may not be provided with the supporting spacers, and the rows of optical filter units provided with the supporting spacers and the rows of optical filter units provided with no supporting spacer may be arranged alternately.

Optionally, each of the optical filter units in the rows of optical filter units provided with the supporting spacers may be provided with the supporting spacer.

Optionally, each of the multiple optical filter units may be provided with the supporting spacer, the supporting spacers corresponding to the optical filter units in all odd-numbered rows may be arranged in a same manner, the supporting spacers corresponding to the optical filter units in all even-numbered rows may be arranged in a same manner, and the supporting spacers corresponding to adjacent ones of the optical filter units in a same column may be staggered.

Optionally, the supporting spacers corresponding to adjacent ones of the optical filter units in a same column may be staggered by 6.0-7.0 millimeters in a row direction.

Optionally, the distance between adjacent ones of the multiple supporting spacers in the rubbing alignment direction of the alignment film, and the length of a contact between a fiber of the rubbing cloth and the alignment film during the rubbing alignment may meet a second preset condition, so that a number of supporting spacers among the multiple supporting spacers that are passed through by the fiber of the rubbing cloth during the contact between the fiber and the alignment film within each rubbing alignment cycle is less than or equal to a second threshold value.

Optionally, the distance between adjacent ones of the multiple supporting spacers may be 66 micrometers, and the second threshold value may be 67.

Optionally, the distance between adjacent ones of the multiple supporting spacers in the rubbing alignment direction of the alignment film may meet a third preset condition, so that an area of an overlapped region of projections of the adjacent supporting spacers on a plane is less than or equal to a third threshold value, with the plane being perpendicular to the rubbing alignment direction.

Optionally, the distance between adjacent ones of the multiple supporting spacers may be 66 micrometers, and the third threshold value may be 3.6.

Optionally, a product of the number of supporting spacers and an area of a top of the supporting spacer may be greater than or equal to a fourth threshold value.

It is further provided a display device in the disclosure.

It is further provided a fabricating method for a display substrate, which includes: providing a base substrate; forming an alignment film on the base substrate; forming multiple supporting spacers on the alignment film; and performing rubbing alignment on the alignment film by using a rubbing cloth. A distance between adjacent ones of the multiple supporting spacers in a rubbing alignment direction of the alignment film, and a length of a contact between a fiber of the rubbing cloth and the alignment film during the rubbing alignment meet a first preset condition, so that a number of supporting spacers among the multiple supporting spacers that are passed through by the fiber of the rubbing cloth during each contact between the fiber and the alignment film is less than or equal to a first threshold value.

The above technical solutions provided in the disclosure have following advantageous effects.

In providing the supporting spacers on the display substrate, the length of the contact between the fiber of the rubbing cloth and the alignment film is taken into consideration, so that the number of supporting spacers that are passed through by a certain fiber of the rubbing cloth during each contact between the fiber and the alignment film is less than or equal to the first threshold value, thereby alleviating the problem of light leakage of the display device caused by the effect of the supporting space on the rubbing alignment.

DETAILED DESCRIPTION

Figure 1:
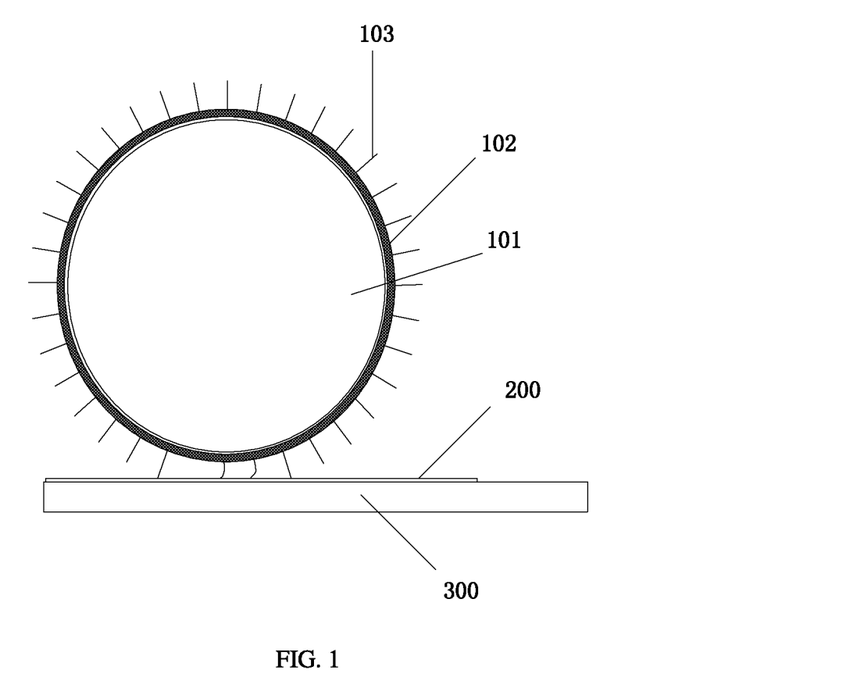
FIG. 1 is a schematic structural diagram of a rubbing alignment apparatus in the related art.

Reference is made to FIG. 1, which is a schematic structural diagram of a rubbing alignment apparatus in the related art. The rubbing alignment apparatus includes a rubbing roller 101, a rubbing cloth 102 on a surface of the rubbing roller 101, and fibers 103 on the rubbing cloth 102.

During the rubbing alignment, a table 300 carries a substrate 200 which is coated with an alignment film and travels toward the rubbing roller 101. The rubbing roller 101 rotates at a certain speed, and a tangential direction of the rotation of the rubbing roller 101 is at a certain angle with a travelling direction of the table 300. By controlling process parameters such as a depth by which the fiber 103 on the rubbing cloth 102 is pressed into the alignment film, grooves which have certain angels and are arranged evenly are formed in the alignment film.

Due to a certain height of the supporting spacer provided on the display substrate, it is difficult to perform rubbing alignment at a shadow of the supporting spacer.

Several experiments proved that, the number of supporting spacers that are passed through by a certain fiber of the rubbing cloth during each contact between the fiber and the alignment film is a prominent factor affecting the size of the shadow of the supporting spacer.

Proof is given by experiment data in the following.

First Experiment

Reference is made to the following table.

| Type of display device | PS height (um) | PS bottom size (um) | PS top size (um) | PS pitch (um) | BM width (Data) | Rubbing condition | LO brightness | PS shadow |
|---|---|---|---|---|---|---|---|---|
| 5.5FHD | 3.2 | 11.5 | 6 | 62.7 | 5.5 | 7018 + 0.4 depth, two rubbings | 0.45 | NG |
| 4.3WVGA | 3.15 | 24 | 10.5 | 117 | 6.5 | 6018 + 0.3 depth, a single rubbing | <0.4 | OK |

PS pitch refers to a distance between adjacent supporting spacers in the rubbing alignment direction of the alignment film. LO brightness refers to the brightness of the darkest image. NG refers to that there is light leakage at the PS shadow; and OK refers to that there is no light leakage at the PS shadow.

It can be seen from the above table that, whether there is light leakage at the shadow is more related to PS pitch, and is less related to the height of the supporting spacer and the size of the supporting spacer.

That is to say, the light leakage at the PS shadow is mainly related to the distance between adjacent PSs in the rubbing alignment direction. The longer the distance is, the less the number of the PSs that are passed through by the fiber of the rubbing cloth during one contact is. The PSs that are passed through later will not negatively affect the rubbing alignment of the fiber on the PS shadow.

Second Experiment

Reference is made to the following table.

| | Roller angle α | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| The number of all the PSs that are passed through within the cycle | 66 | 63 | 62 | 61 | 70 | 63 | 66 | 64 | 62 | 68 | 66 | 67 | 58 |
| PS pitch (um) | 62.7 | 62.7 | 62.7 | 62.7 | 62.7 | 62.7 | 62.7 | 62.7 | 62.7 | 62.7 | 66 | 66 | 66 |

-continued

| | Roller angle α | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| The number of PSs that are passed through continuously | 11 | 6 | 4 | 3 | 3 | 2 | 2 | 2 | 4 | 2 | 2 | 2 | 2 |
| The area of overlapped region of interactional PSs (um) | 12 | 9.3 | 9.3 | 9.3 | 6.7 | 6.7 | 6.7 | 6.7 | 6.7 | 6.7 | 3.6 | 3.6 | 3.6 |
| PS shadow | NG | NG | NG | NG | NG | NG | NG | NG | NG | NG | OK | OK | OK |

Roller angle α refers to an angle between a tangential direction of the rotation of the rubbing roller and the travelling direction of the table. The number of all the PSs that are passed through within the cycle refers to the number of supporting spacers that are passed through by a certain fiber of the rubbing cloth during the contact between the fiber and the alignment film within each rubbing alignment cycle. The rubbing alignment cycle refers to a process during which the display substrate becomes in contact with the rubbing roller and then passes through the rubbing roller and finally leaves the rubbing roller completely in the rubbing alignment direction. PS pitch refers to a distance between adjacent supporting spacers in the rubbing alignment direction of the alignment film. The number of PSs that are passed through continuously refers to the number of supporting spacers that are passed through by a certain fiber of the cloth during each contact between the fiber and the alignment film.

The area of overlapped region of interactional PSs refers to the area of the overlapped region of projections of the adjacent supporting spacers on a plane perpendicular to the rubbing alignment direction. PS shadow refers to the shadow of the supporting spacer. NG refers to that there is light leakage at the PS shadow. OK refers to that there is no light leakage at the PS shadow.

Figure 2:
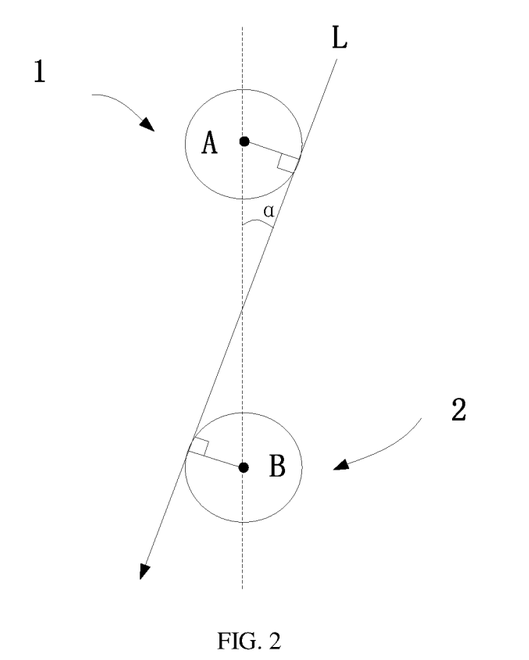
FIG. 2 is a schematic diagram showing a positional relation between a fiber of a rubbing cloth and a supporting spacer.

Referring to FIG. 2, the process of the fiber of the rubbing cloth passing through the supporting spacer is illustrated.

In FIG. 2, two supporting spacers 1 and 2 arranged in a column direction are included. The circle shown in FIG. 2 denotes a section of a bottom of the supporting spacer. Points A and B respectively denotes centers of the sections of the bottoms of the supporting spacers 1 and 2. Angle α is an angle between the tangential direction of the rotation of the rubbing roller and the travelling direction of the table. The rubbing route of the fiber of the rubbing cloth is abstracted as a straight line L, and the arrow denotes the rubbing alignment direction. If a vertical distance from the center of the section of the bottom of the supporting spacer to the straight line L is less than the radium of the section of the bottom, it is considered that the fiber of the rubbing cloth passes through this supporting spacer.

It can be seen from the above experiment data that, the number of supporting spacers that are passed through by a certain fiber of the rubbing cloth during each contact between the fiber and the alignment film has more significant effect on the shadow of the supporting spacer. The less the number of supporting spacers that are passed through by a certain fiber of the rubbing cloth during each contact between the fiber and the alignment film is, the less the phenomenon of light leakage at the PS shadow is.

The number of supporting spacers that are passed through by a certain fiber of the rubbing cloth during each contact between the fiber and the alignment film is related to the distance between adjacent supporting spacers in the rubbing alignment direction of the alignment film and the length of the contact between the fiber of the rubbing cloth and the alignment film during the rubbing alignment.

To solve the problem that it is difficult to perform rubbing alignment at a shadow of the supporting spacer during the rubbing alignment, it is provided a display substrate in one embodiment of the disclosure. The display substrate includes: a base substrate, an alignment layer and multiple supporting spacers. The alignment layer and the supporting spacers are provided on the base substrate. The alignment layer is formed by performing rubbing alignment on an alignment film formed on the base substrate by using a rubbing cloth. A distance between adjacent ones of the multiple supporting spacers in a rubbing alignment direction of the alignment film, and a length of a contact between a fiber of the rubbing cloth and the alignment film during the rubbing alignment meet a first preset condition, so that the number of supporting spacers among the multiple supporting spacers that are passed through by a certain fiber of the rubbing cloth during each contact between the fiber and the alignment film is less than or equal to a first threshold value.

That is, the first preset condition is met if the number of supporting spacers among the multiple supporting spacers that are passed through by a certain fiber of the rubbing cloth during each contact between the fiber and the alignment film is less than or equal to the first threshold value. In application, the first threshold value may be determined based on multiple experiment results. The first threshold value may be a critical value. That is, if the number of supporting spacers among the multiple supporting spacers that are passed through by a certain fiber of the rubbing cloth during each contact between the fiber and the alignment film is less than or equal to the first threshold value, there is almost or completely no light leakage at the shadow of the supporting spacer. If the number of supporting spacers among the multiple supporting spacers that are passed through by a certain fiber of the rubbing cloth during the contact between the fiber and the alignment film is greater than the first threshold value, there is light leakage at the shadow of the supporting spacer.

That is, in one embodiment of the disclosure, to reduce the effect of the supporting spacer on the rubbing alignment process, the length of a contact between a fiber of the rubbing cloth and the alignment film during the rubbing alignment is taken into consideration in providing the supporting spacer on the display substrate, so that the number of supporting spacers among the multiple supporting spacers that are passed through by a certain fiber of the rubbing cloth during the contact between the fiber and the alignment film is less than or equal to the first threshold, thereby alleviating the problem of light leakage of the display device caused by the effect of the supporting space on the rubbing alignment.

Optionally, the distance between adjacent ones of the multiple supporting spacers is 66 micrometers, and the first threshold value is 2.

It can be seen from the above experiment data that, the factor affecting the size of the shadow area of the supporting spacer further includes a number of supporting spacers that are passed through by a certain fiber of the rubbing cloth during the contact between the fiber and the alignment film within each rubbing alignment cycle. Thus, optionally, the distance between adjacent ones of the multiple supporting spacers in the rubbing alignment direction of the alignment film, and the length of a contact between a fiber of the rubbing cloth and the alignment film during the rubbing alignment further meet a second preset condition, so that the number of supporting spacers that are passed through by a certain fiber of the rubbing cloth during the contact between the fiber and the alignment film within each rubbing alignment cycle is less than or equal to a second threshold value.

That is, the second preset condition is met if the number of supporting spacers that are passed through by a certain fiber of the rubbing cloth during the contact between the fiber and the alignment film within each rubbing alignment cycle is less than or equal to the second threshold value. In application, the second threshold value may be determined based on multiple experiment results. The second threshold value may be a critical value. That is, if the number of supporting spacers that are passed through by a certain fiber of the rubbing cloth during the contact between the fiber and the alignment film within each rubbing alignment cycle is less than or equal to the second threshold value, there is almost or completely no light leakage at the shadow of the supporting spacer. If the number of supporting spacers that are passed through by a certain fiber of the rubbing cloth during the contact between the fiber and the alignment film within each rubbing alignment cycle is greater than the second threshold value, there is light leakage at the shadow of the supporting spacer.

Optionally, the distance between adjacent ones of the multiple supporting spacers may be 66 micrometers, and the second threshold value may be 67.

It can be seen from the above experiment data that, the factor affecting the size of the shadow area of the supporting spacer further includes an area of an overlapped region of projections of the adjacent supporting spacers on a plane. The smaller the area of the overlapped region is, the smaller the shadow area of the supporting spacer. Thus, optionally, the distance between adjacent ones of the multiple supporting spacers in the rubbing alignment direction of the alignment film meets a third preset condition, so that an area of an overlapped region of projections of the adjacent supporting spacers on a plane is less than or equal to a third threshold value, with the plane being perpendicular to the rubbing alignment direction.

The third preset condition is met if the area of the overlapped region of projections of the adjacent supporting spacers on the plane is less than or equal to the third threshold value. In application, the third threshold value may be determined based on multiple experiment results. The third threshold value may be a critical value. That is, if the area of the overlapped region of projections of the adjacent supporting spacers on the plane is less than or equal to the third threshold value, there is almost or completely no light leakage at the shadow of the supporting spacer. If the area of the overlapped region of projections of the adjacent supporting spacers on the plane is greater than the third threshold value, there is light leakage at the shadow of the supporting spacer.

Optionally, the distance between adjacent ones of the multiple supporting spacers is 66 micrometers, and the third threshold value is 3.6.

Practically, in the above embodiments, to ensure the supporting strength of the supporting spacer after two display substrates are arranged opposite to each other to form a cell, a total supporting area of all the supporting spacers should meet a critical value. That is, a product of the number of supporting spacers and an area of a top of the supporting spacer is greater than or equal to a fourth threshold value. By way of example, the top of the supporting spacer refers to the end of the supporting spacer in contact with the array substrate when the supporting spacer is located on the color film substrate, and refers to the end of the supporting spacer in contact with the color film substrate when the supporting spacer is located on the array substrate.

In application, the fourth threshold value may be determined based on multiple experiment results. The fourth threshold value may be a critical value. That is, if the product of the number of supporting spacers and the area of the top of the supporting spacer is greater than or equal to the fourth threshold value, the requirement on the supporting strength is met. If the product of the number of supporting spacers and the area of the top of the supporting spacer is less than the fourth threshold value, the requirement on the supporting strength is not met.

The specific fourth threshold value varies with different color film substrate.

Optionally, the above display substrate is a color film substrate. Practically, the display substrate may be an array substrate.

Hereinafter, the providing of the supporting spacer in the display substrate according to the embodiment of the disclosure will be described by taking the display substrate being the color film substrate as an example.

Hereinafter, the specific embodiments of the disclosure will be described in further detail in conjunction with the drawings and examples. The following examples are only illustrative but not meant to limit the scope of the disclosure.

Figure 3:
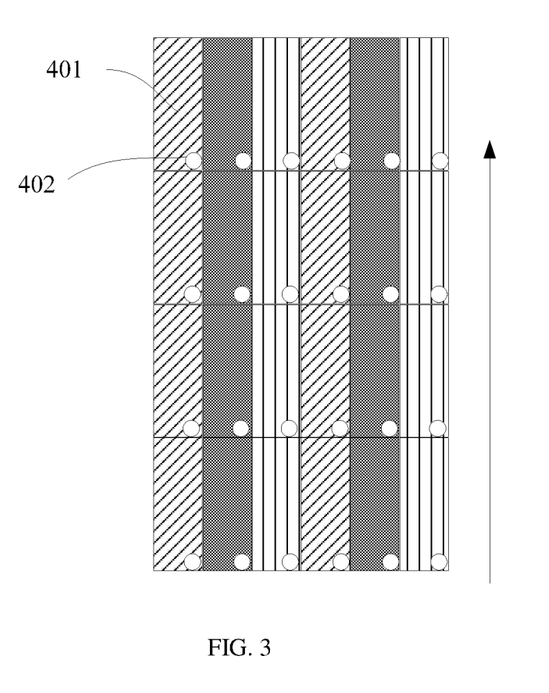
FIG. 3 is a schematic structural diagram of a color film substrate in the related art.

Reference is made to FIG. 3, which is a schematic structural diagram of a color film substrate in the related art.

In the related art, a supporting spacer 402 is provided in a respective region of each optical filter unit 401. A row of supporting spacers 402 corresponding to a row of optical filter units 401 are aligned with each other. A column of supporting spacers 402 corresponding to a column of optical filter units 401 are aligned with each other. The arrow shown in FIG. 3 indicates the rubbing alignment direction (that is, the direction of the column of optical filter units). In this configuration, the number of supporting spacers that are passed through by a certain fiber of the rubbing cloth during each contact between the fiber and the alignment film is more.

Figure 4:
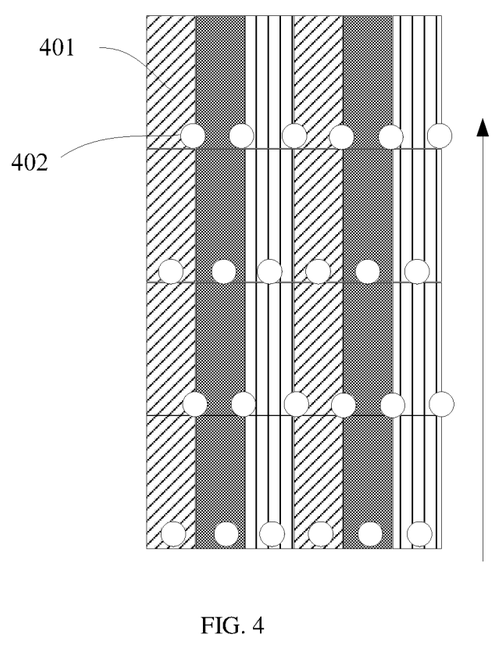
FIG. 4 is a schematic structural diagram of a color film substrate according to at least one embodiment of the disclosure.

Reference is made to FIG. 4, which is a schematic structural diagram of a color film substrate according to at least one embodiment of the disclosure.

In one embodiment of the disclosure, a supporting spacer 402 is provided in a respective region of each optical filter unit 401. The supporting spacers 402 corresponding to the optical filter units 401 in all odd-numbered rows are arranged in a same manner, the supporting spacers 402 corresponding to the optical filter units 401 in all even-numbered rows are arranged in a same manner. The supporting spacers 402 corresponding to adjacent ones of the optical filter units 401 in a same column are staggered.

The arrow in FIG. 4 denotes the rubbing alignment direction (that is, the direction of the column of optical filter units). In this configuration, the supporting spacers 402 corresponding to adjacent ones of the optical filter units 401 in a same column are staggered, thus the distance between adjacent supporting spacers 402 in the rubbing alignment direction is greater, and the number of supporting spacers that are passed through by a certain fiber of the rubbing cloth during the contact between the fiber and the alignment film is smaller, thereby reducing the effect of the supporting spacer on the rubbing alignment.

Optionally, the supporting spacers 402 corresponding to adjacent ones of the optical filter units 401 in a same column is staggered by 6.0-7.0 millimeters in a row direction.

Figure 5:
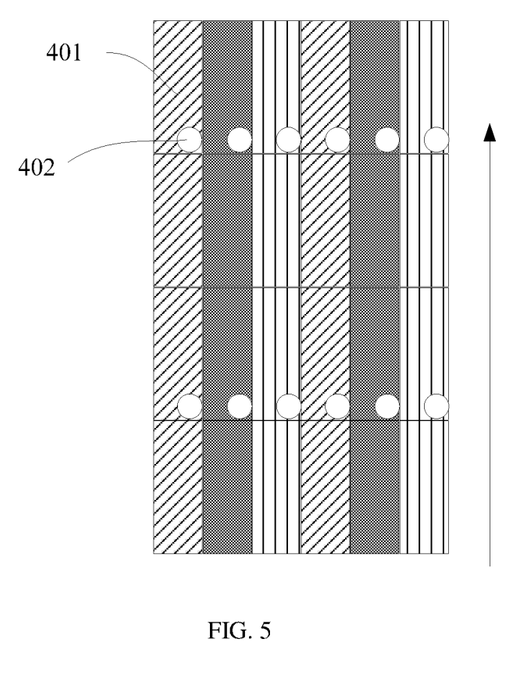
FIG. 5 is a schematic structural diagram of a color film substrate according to at least one embodiment of the disclosure.

Reference is made to FIG. 5, which is a schematic structural diagram of a color film substrate according to at least one embodiment of the disclosure.

In one embodiment of the disclosure, some rows of optical filter units 401 are provided with the supporting spacers 402, and some rows of optical filter units 401 are not provided with the supporting spacers 402. The rows of optical filter units 401 provided with the supporting spacers 402 and the rows of optical filter units 401 provided with no supporting spacer 402 are arranged alternately.

Optionally, each of the optical filter units 401 in the rows of optical filter units 401 provided with the supporting spacers 402 is provided with the supporting spacer 402.

The arrow in FIG. 5 denotes the rubbing alignment direction (that is, the direction of the column of optical filter units). In this configuration, the distance between adjacent supporting spacers 402 in the rubbing alignment direction is greater, and the number of supporting spacers that are passed through by a certain fiber of the rubbing cloth during each contact between the fiber and the alignment film is smaller, thereby reducing the effect of the supporting spacer on the rubbing alignment.

Figure 6:
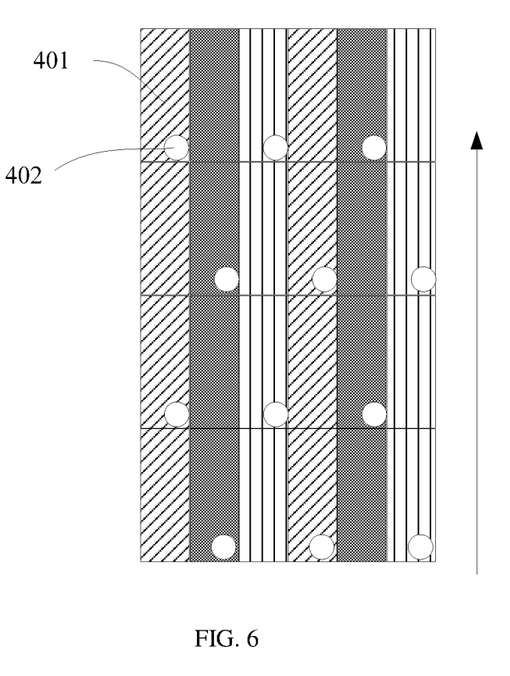
FIG. 6 is a schematic structural diagram of a color film substrate according to at least one embodiment of the disclosure.

Reference is made to FIG. 6, which is a schematic structural diagram of a color film substrate according to at least one embodiment of the disclosure.

In one embodiment of the disclosure, some of the optical filter units 401 are provided with the supporting spacers 402, and some of the optical filter units 401 are not provided with the supporting spacers 402. The optical filter units 401 provided with the supporting spacers 402 and the optical filter units 401 provided with no supporting spacer 402 are arranged alternately in the row direction and the column direction.

The arrow in FIG. 6 denotes the rubbing alignment direction (that is, the direction of the column of optical filter units). In this configuration, the distance between adjacent supporting spacers 402 in the rubbing alignment direction is greater, and the number of supporting spacers that are passed through by a certain fiber of the rubbing cloth during each contact between the fiber and the alignment film is smaller, thereby reducing the effect of the supporting spacer on the rubbing alignment.

Figure 7:
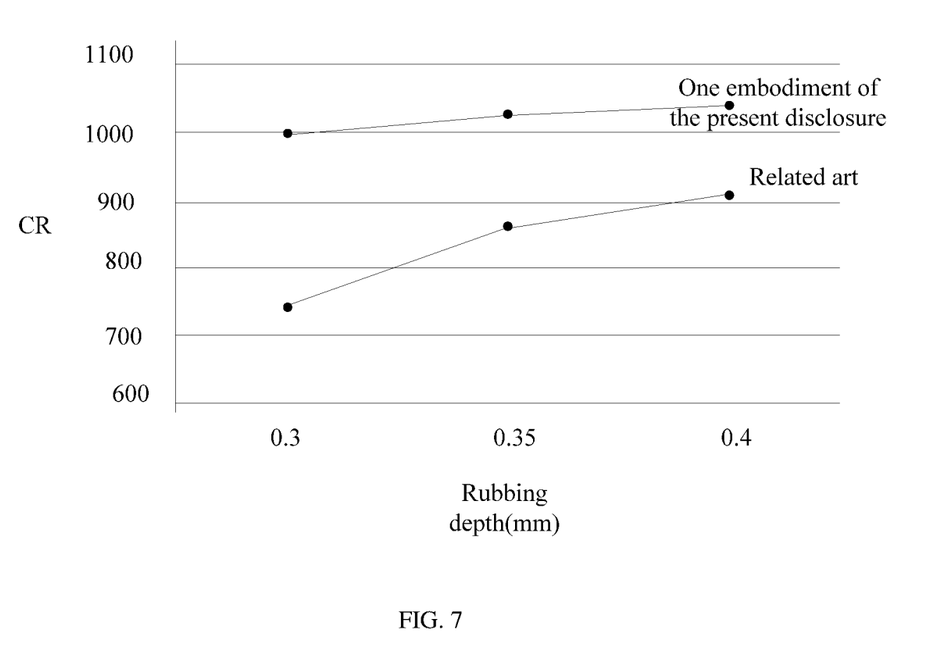
FIG. 7 is a comparison diagram illustrating display performances of a display device including the color film substrate shown in FIG. 3 and a display device including the color film substrate shown in FIG. 6.

Reference is made to FIG. 7, which is a comparison diagram illustrating display performances of a display device including the color film substrate shown in FIG. 3 and a display device including the color film substrate shown in FIG. 6. As can be seen from FIG. 7, the display device including the color film substrate according to the embodiment of the disclosure has higher contrast ratio (CR).

It is further provided a display device in the disclosure, which includes the display substrate described in any one of the above embodiments.

It is further provided a method for manufacturing a display substrate in the disclosure, which includes: step S11: providing a base substrate; step S12: forming an alignment film on the base substrate; step S13: forming multiple supporting spacers on the alignment film; and step S14: performing rubbing alignment on the alignment film by using a rubbing cloth.

A distance between adjacent ones of the multiple supporting spacers in a rubbing alignment direction of the alignment film, and a length of a contact between a fiber of the rubbing cloth and the alignment film during the rubbing alignment meet a first preset condition, so that a number of supporting spacers among the multiple supporting spacers that are passed through by a certain fiber of the rubbing cloth during each contact between the fiber and the alignment film is less than or equal to a first threshold value.

The above are preferred embodiment of the disclosure. It is to be noted that, many improvements and modifications may be made by those ordinary skilled in the art without deviating from the principle of the disclosure, which improvements and modifications should be deemed as within the scope of protection of the disclosure.

What is claimed is:

1. A display substrate, comprising:
   a base substrate; and
   an alignment layer and a plurality of supporting spacers, which are on the base substrate, with the alignment layer being formed by performing rubbing alignment on an alignment film on the base substrate by using a rubbing cloth;
   wherein a distance between adjacent supporting spacers of the plurality of supporting spacers in a rubbing alignment direction of the alignment film is selected such that during contact between a fiber of the rubbing cloth and the alignment film during the rubbing alignment, a number of supporting spacers that are continuously passed through by the fiber of the rubbing cloth during each contact between the fiber of the rubbing cloth and the alignment film is equal to or less than 2; and
   wherein each of the supporting spacers has a bottom end and a top end, a bottom surface of the bottom end being in contact with a surface of the alignment film that is positioned distal to the base substrate; and
   wherein a size of the top end is 6 micrometers and a size of the bottom end is 11.5 micrometers, or the size of the top end is 10.5 micrometers and the size of the bottom end is 24 micrometers.

2. The display substrate according to claim 1, wherein the distance between the adjacent supporting spacers is 66 micrometers.

3. The display substrate according to claim 1, wherein the display substrate is a color film substrate further comprising a plurality of optical filter units arranged in rows and columns, and the rubbing alignment direction is a column direction of the optical filter units.

4. The display substrate according to claim 3, wherein some of the plurality of optical filter units are provided with the supporting spacers, and some of the plurality of optical filter units are not provided with the supporting spacers, and the optical filter units provided with the supporting spacers and the optical filter units provided with no supporting spacer are arranged alternately in a row direction and a column direction.

5. The display substrate according to claim 3, wherein some rows of optical filter units of the plurality of optical filter units are provided with the supporting spacers, and some rows of optical filter units of the plurality of optical filter units are not provided with the supporting spacers, and the rows of optical filter units provided with the supporting spacers and the rows of optical filter units provided with no supporting spacer are arranged alternately.

6. The display substrate according to claim 5, wherein each of the optical filter units in the rows of optical filter units provided with the supporting spacers is provided with the supporting spacer.

7. The display substrate according to claim 3, wherein each of the plurality of optical filter units is provided with the supporting spacer, the supporting spacers corresponding to the optical filter units in all odd-numbered rows are arranged in a same manner, the supporting spacers corresponding to the optical filter units in all even-numbered rows are arranged in a same manner, and the supporting spacers corresponding to the adjacent supporting spacers of the optical filter units in a same column are staggered.

8. The display substrate according to claim 7, wherein the supporting spacers corresponding to the adjacent supporting spacers of the optical filter units in a same column are staggered by 6.0-7.0 micrometers in a row direction.

9. The display substrate according to claim 1, wherein the distance between the adjacent supporting spacers in the rubbing alignment direction of the alignment film is selected such that during contact between the fiber of the rubbing cloth and the alignment film, a number of the supporting spacers that are contacted the fiber of the rubbing cloth within each rubbing alignment cycle is less than or equal to 67.

10. The display substrate according to claim 1, wherein the distance between the adjacent supporting spacers in the rubbing alignment direction of the alignment film is selected such that an area of an overlapped region of projections of the adjacent supporting spacers on a plane is less than or equal to 3.6, and the plane is perpendicular to the rubbing alignment direction.

11. The display substrate according to claim 1, wherein a product of the number of supporting spacers and an area of a top of the supporting spacer is greater than or equal to a fourth threshold value.

12. A display device, comprising the display substrate according to claim 1.

13. A method for manufacturing a display substrate, comprising:
providing a base substrate;
forming an alignment film on the base substrate;
forming a plurality of supporting spacers on the alignment film in such a manner that each of the supporting spacers has a bottom end and a top end, a bottom surface of the bottom end being in contact with a surface of the alignment film that is positioned distal to the base substrate; and
performing rubbing alignment on the alignment film by using a rubbing cloth with a quantity of supporting spacers that are continuously passed through by a fiber of the rubbing cloth during each contact between the fiber of the rubbing cloth and the alignment film being less than or equal to 2,
wherein a size of the top end is 6 micrometers and a size of the bottom end is 11.5 micrometers, or the size of the top end is 10.5 micrometers and the size of the bottom end is 24 micrometers.

14. The method according to claim 13, wherein an area of an overlapped region of projections of the adjacent supporting spacers on a plane is less than or equal to 3.6, and the plane is perpendicular to a rubbing alignment direction.

15. The method according to claim 13, wherein the supporting spacers that are continuously passed through by the fiber of the rubbing cloth during each contact between the fiber of the rubbing cloth and the alignment film include one supporting spacer that meets conditions that when a rubbing route of the fiber of the rubbing cloth is abstracted as a straight line and when a vertical distance from a center of a section of a bottom of the one supporting spacer to the straight line is less than a radium of the section of the bottom of the one supporting spacer.

16. A method for manufacturing a display substrate, comprising:
providing a base substrate;
forming an alignment film on the base substrate;
forming a plurality of supporting spacers on the alignment film in such a manner that each of the supporting spacers has a bottom end and a top end, a bottom surface of the bottom end being in contact with a surface of the alignment film that is positioned distal to the base substrate; and
performing rubbing alignment on the alignment film by using a rubbing cloth with a quantity of supporting spacers that are continuously passed through by a fiber of the rubbing cloth during each contact between the fiber of the rubbing cloth and the alignment film being less than or equal to 2;
wherein a quantity of supporting spacers among the plurality of supporting spacers that are contacted by the fiber of the rubbing cloth during the contact between the fiber and the alignment film within each rubbing alignment cycle is less than or equal to 67,
wherein a size of the top end is 6 micrometers and a size of the bottom end is 11.5 micrometers, or the size of the top end is 10.5 micrometers and the size of the bottom end is 24 micrometers.

17. The method according to claim 16, wherein a distance between adjacent supporting spacers is 66 micrometers, and an area of an overlapped region of projections of the adjacent supporting spacers on a plane is less than or equal to 3.6, with the plane being perpendicular to a rubbing alignment direction.

* * * * *